United States Patent
Jin et al.

(10) Patent No.: US 10,381,675 B2
(45) Date of Patent: Aug. 13, 2019

(54) FUEL CELL STACK

(71) Applicants: Hyundai Motor Company, Seoul (KR); Kia Motors Corporation, Seoul (KR)

(72) Inventors: Sang Mun Jin, Gyeonggi-do (KR); Yoo Chang Yang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 385 days.

(21) Appl. No.: 15/206,416

(22) Filed: Jul. 11, 2016

(65) Prior Publication Data
US 2017/0084932 A1 Mar. 23, 2017

(30) Foreign Application Priority Data
Sep. 23, 2015 (KR) .................. 10-2015-0134472

(51) Int. Cl.
| | | |
|---|---|---|
| *H01M 8/0258* | (2016.01) | |
| *H01M 8/04007* | (2016.01) | |
| *H01M 8/241* | (2016.01) | |
| *H01M 8/2457* | (2016.01) | |
| *H01M 8/2483* | (2016.01) | |

(Continued)

(52) U.S. Cl.
CPC ....... *H01M 8/2457* (2016.02); *H01M 8/0254* (2013.01); *H01M 8/0258* (2013.01); *H01M 8/0267* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | |
|---|---|---|
| 2008/0007018 A1 | 1/2008 | Horn |
| 2009/0214915 A1 | 8/2009 | Kwon |

(Continued)

FOREIGN PATENT DOCUMENTS

| | | |
|---|---|---|
| JP | 2007-226991 A | 9/2007 |
| JP | 2010-015725 A | 1/2010 |

(Continued)

OTHER PUBLICATIONS

JP 2007-226991—English translation (Year: 2007).*

*Primary Examiner* — Haroon S. Sheikh
(74) *Attorney, Agent, or Firm* — Mintz Levin Cohn Ferris Glovsky and Popeo, P.C.; Peter F. Corless

(57) ABSTRACT

A fuel cell stack includes a first separator and a second separator that are adhered to face each other between adjacent membrane electrode assemblies (MEAs) and each have a plurality of manifolds, a reacting region, and a guide region disposed between the plurality of manifolds and the reacting region. In the fuel cell stack, a first cooling medium guide channel guiding flow of a cooling medium between the plurality of manifolds and the reacting region is formed in the guide region of the first separator; a second cooling medium guide channel guiding flow of the cooling medium between the plurality of manifolds and the reacting region is formed in the guide region of the second separator; and at least portions of the first cooling medium guide channel and the second cooling medium guide channel overlap to communicate with each other.

14 Claims, 13 Drawing Sheets

(51) Int. Cl.
*H01M 8/0254* (2016.01)
*H01M 8/0267* (2016.01)

(56) References Cited

U.S. PATENT DOCUMENTS

2010/0214501 A1 8/2010 Lee et al.
2011/0033781 A1 2/2011 Chin et al.

FOREIGN PATENT DOCUMENTS

| KR | 2006-0130958 A | 12/2006 |
| KR | 10-0953533 B1 | 4/2010 |
| KR | 10-0986525 B1 | 10/2010 |
| KR | 2011-0008925 A | 1/2011 |
| KR | 10-1134429 B1 | 4/2012 |
| KR | 10-1315622 B1 | 10/2013 |

\* cited by examiner

FUEL CELL STACK

CROSS-REFERENCE TO RELATED APPLICATION

This application claims under 35 U.S.C. §119(a) the benefit of Korean Patent Application No. 10-2015-0134472, filed on Sep. 23, 2015 in the Korean Intellectual Property Office, the entire contents of which are incorporated by reference herein.

BACKGROUND (a) Technical Field

The present invention relates to a fuel cell stack and, more particularly, to a fuel cell stack in which machining accuracy of a cooling medium guide channel is enhanced in a guide region of each separator, and a cooling medium is effectively distributed to significantly enhance heat transmission efficiency.

(b) Description of the Related Art

A fuel cell includes a fuel cell stack producing electrical energy, a fuel supply system supplying fuel (hydrogen) to the fuel cell stack, an air supply system including an air blower and a humidifier to supply oxygen in the air, an oxidizer required for an electrochemical reaction to the fuel cell stack, and a heat and water management system controlling an operation temperature of the fuel cell stack.

As illustrated in FIG. 1 (RELATED ART), the fuel cell stack is formed by stacking a plurality of unit fuel cells 40, and the unit fuel cells 40 each have a membrane electrode assembly (MEA) 10 and a pair of separators 20 and 30 tightly attached to opposing surfaces of the MEA 10.

The MEA 10 includes a solid polymer electrolyte membrane enabling a hydrogen proton to move and catalytic layers, that is, a cathode and an anode, applied to opposing surfaces of the electrolyte membrane such that hydrogen and oxygen may react with each other.

A gas diffusion layer (GDL) is positioned on outer surfaces of the MEA 10, that is, portions where the cathode and the anode are positioned, and the pair of separators 20 and 30 is positioned on outer sides of the GDL.

The pair of separators 20 and 30 has reacting gas channels 23 and 33 supplying a reacting gas (fuel or air) and discharging water produced according to a reaction, respectively.

The pair of separators 20 and 30 include a cathode separator 20 tightly attached to the cathode of the MEA 10 and an anode separator 30 tightly attached to the anode of the MEA 10.

A cathode reacting surface is formed on one surface of the cathode separator 20 and a plurality of air channels 23 supplying air as an oxidizer to the cathode of the MEA 10 are formed on the cathode reacting surface. A cathode cooling surface is formed on the other surface of the cathode separator 20, and a plurality of cooling channels 24 distributing a cooling medium are formed on the cathode cooling surface.

An anode reacting surface is formed on one surface of the anode separator 30, and a plurality of fuel channels 33 supplying fuel to the anode of the MEA 10 are formed on the anode reacting surface. An anode cooling surface is formed on the other surface of the anode separator, and a plurality of cooling channels 34 distributing a cooling medium are formed on the anode cooling surface.

In the fuel cell stack, as the plurality of unit fuel cells 40 are stacked in a vertical direction, the cathode separator 20 of one unit fuel cell 40 and the anode separator 30 of the other unit fuel cell 40 are adhered to face each other between adjacent MEAs 10, and in particular, the cooling channels 24 of the cathode separator 20 and the cooling channels 34 of the anode separator 30 join to form cooling passages 24 and 34 for distributing a cooling medium, and accordingly, a pair of cooling passages 24 and 34 is symmetrically disposed on opposing sides of each of the MEAs 10.

FIG. 2 (RELATED ART) is a plan view illustrating a portion of a cooling surface of a conventional cathode separator.

As illustrated in FIG. 2, a plurality of manifolds 7, 8, and 9 are provided in at least one end of each of the separators 20 and 30, and the plurality of manifolds 7, 8, and 9 may be an air manifold 7, a cooling medium manifold 8, and a fuel manifold 9.

A cooling surface (or reacting surface) of each of the separators 20 and 30 includes a guide region 4 adjacent to the plurality of manifolds 7, 8, and 9 and a reacting region 2 in which an electrochemical reaction takes place. The reacting region 2 may need to secure predetermined contact pressure to move electricity produced according to the electrochemical reaction, and the guide region 4, in which an electrochemical reaction does not take place, is configured to simply guide flow of a fluid (air, fuel, or cooling medium) between the manifolds and the reacting region 2.

In order to smoothly distribute a reacting gas, the plurality of reacting gas channels 23 and 33 are formed to continue from the guide region 4 to the reacting region 2 on the reacting surfaces of the separators 20 and 30, whereby the reacting gas channels in the guide region 4 and the reacting gas channels in the reacting region 2 are respectively matched (i.e., in a one-to-one manner).

Since the plurality of manifolds 7, 8, and 9 are formed in the ends of the separators 20 and 30, the guide region 4 has an area narrower than that of the reacting region 2. Thus, as the plurality of reacting gas channels are intended to be continuously formed from the guide region 4 to the reacting region 2 on the reacting surfaces of the separators 20 and 30, the plurality of cooling channels 24 and 34 are inevitably formed to continue from the guide region 4 to the reacting region 2 on the cooling surfaces opposing the reacting surfaces. However, as illustrated in FIG. 2, pitches between the cooling channels 24 and 34 are so narrow that the cooling channels 24 and 34 are very difficult to form.

In particular, in a case where the cooling channels 24 and 34 of the separators 20 and 30 are formed through stamping by using a thin plate material with low elongation, if pitches between the cooling channels are 1.5 or less, it is very difficult to process the cooling channels and cracks may readily occur in the cooling channels.

Thus, in the related art separators 20 and 30, formability of the cooling channels 24 and 34 in the narrow guide region 4 is lowered, which leads to a reduction in the number of cooling channels 24 and 34. This, however, may degrade an effective distribution of a cooling medium or heat transmission efficiency, resulting in deterioration of overall efficiency of a fuel cell.

SUMMARY

An aspect of the present invention provides a fuel cell stack in which machining accuracy of a cooling medium guide channel is significantly enhanced in a guide region of each separator, and a cooling medium is effectively distributed to significantly enhance heat transmission efficiency.

According to an exemplary embodiment of the present invention, there is provided a fuel cell stack formed by stacking unit fuel cells each having a membrane electrode assembly (MEA) and a pair of separators disposed on opposing sides of the MEA, including: a first separator and a second separator adhered to face each other between adjacent MEAs and each have a plurality of manifolds, a reacting region, and a guide region disposed between the plurality of manifolds and the reacting region; a first cooling medium guide channel guiding flow of a cooling medium between the plurality of manifolds and the reacting region formed in the guide region of the first separator; a second cooling medium guide channel guiding flow of a cooling medium between the plurality of manifolds and the reacting region formed in the guide region of the second separator; and at least portions of the first cooling medium guide channel and the second cooling medium guide channel overlap to communicate with each other.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
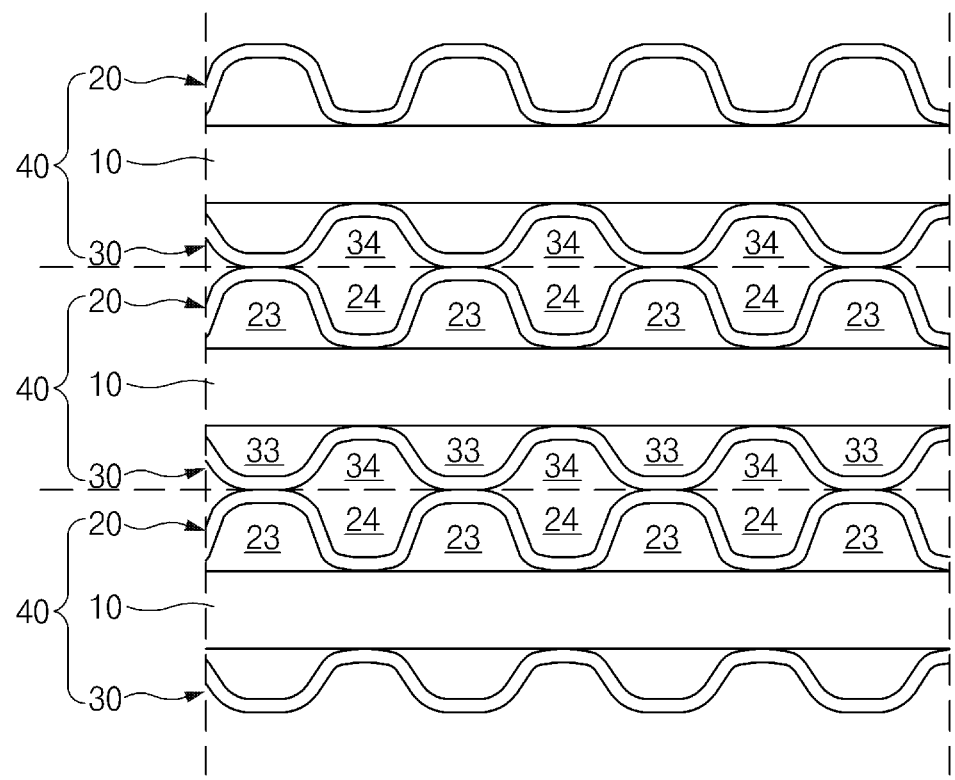
FIG. 1 (RELATED BD ART) is a cross-sectional view illustrating part of reacting surfaces of a conventional fuel cell stack.
Figure 2:
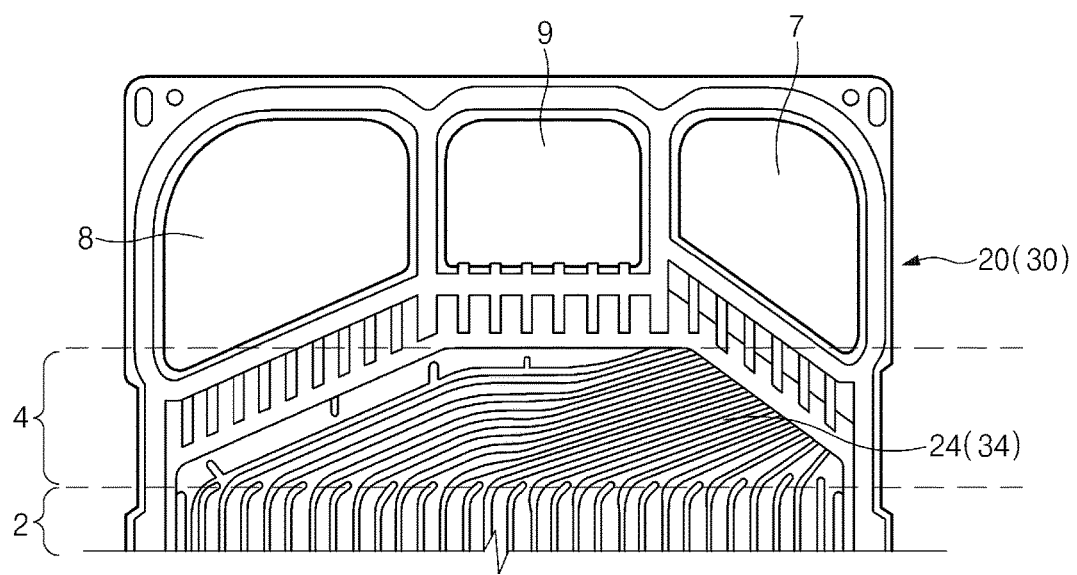
FIG. 2 (RELATED ART) is a view illustrating a guide region of a cooling surface of a separator of a conventional fuel cell stack.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiment of the present invention will be described in detail with reference to the accompanying drawings. For reference, dimensions of elements or thicknesses of lines illustrated in the drawings referral to describe the present invention may be exaggerated for the convenience of understanding. Also, the terms used henceforth have been defined in consideration of the functions of the present invention, and may be altered according to the intent of a user or operator, or conventional practice. Therefore, the terms should be defined on the basis of the entire content of this specification.

A fuel cell stack according to an exemplary embodiment of the present invention is formed by stacking a plurality of unit fuel cells (not shown) each having a membrane electrode assembly (MEA) (not shown) and a pair of separators 200 and 300 disposed on opposing sides of the MEA, such that in order to form a reacting gas passage and a cooling passage between MEAs of adjacent unit fuel cells, the first separator 200 and the second separator 300 are disposed to face each other (see, e.g., FIG. 1, illustrating the general configuration of a conventional fuel cell).

Figure 3:
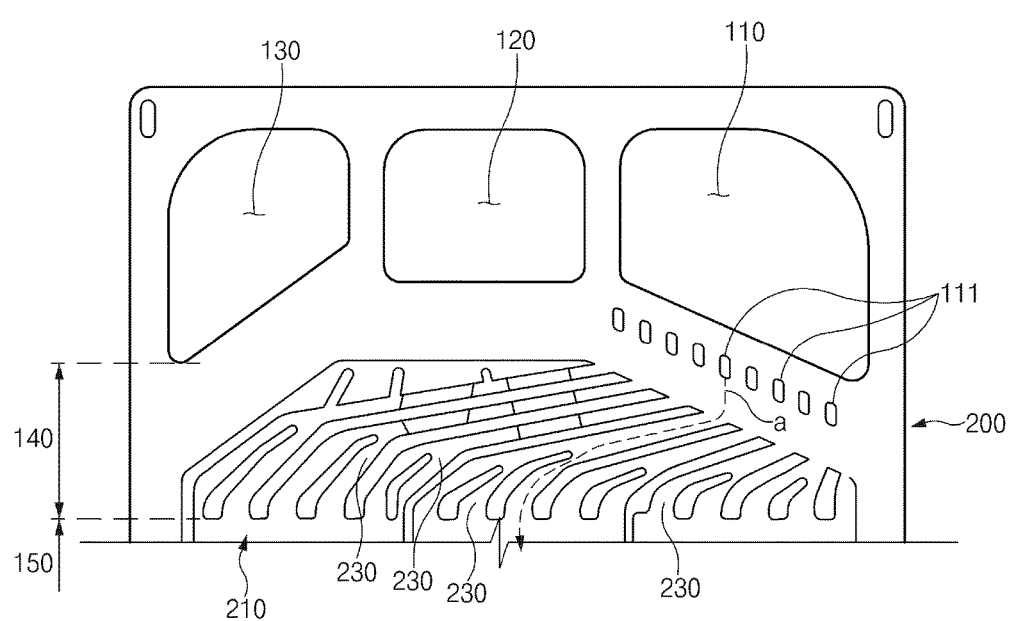
FIG. 3 is a view illustrating a reacting surface of a first separator of a fuel cell stack according to an exemplary embodiment of the present invention.
Figure 4:
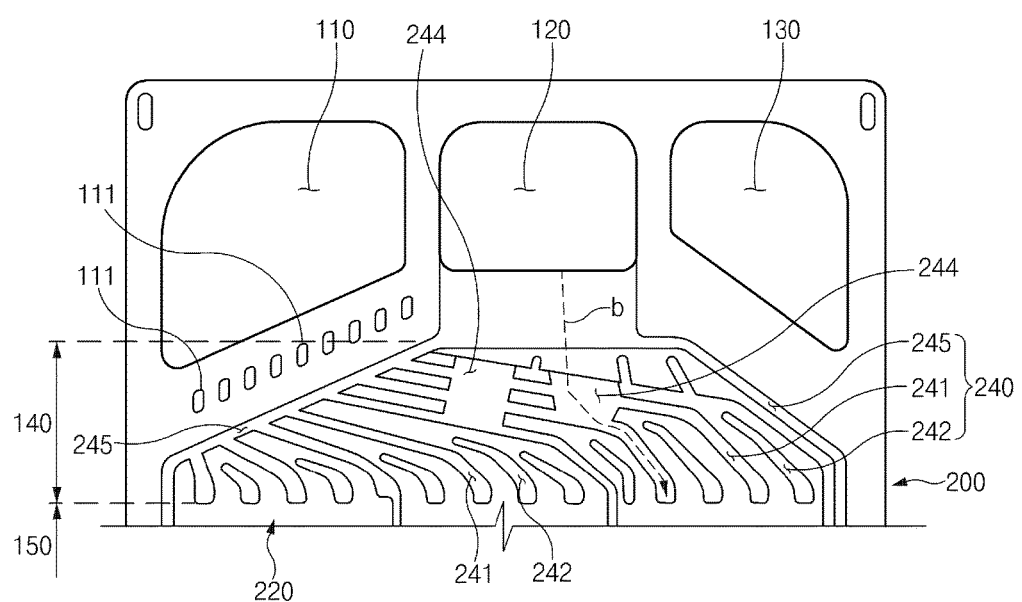
FIG. 4 is a view illustrating a cooling surface of the first separator of a fuel cell stack according to an exemplary embodiment of the present invention.

As illustrated in FIGS. 3 and 4, according to the present invention, a plurality of manifolds 110, 120, and 130 are formed in at least one end portion of the first separator 200. The plurality of manifolds 110, 120, and 130 can be: a first reacting gas manifold 110 supplying or discharging a first reacting gas, a cooling medium manifold 120 supplying or discharging a cooling medium, and a second reacting gas manifold 130 supplying or discharging a second reacting gas, respectively. A plurality of communicating holes 111 communicating with the first reacting gas manifold 110 are formed to be adjacent to the first reacting gas manifold 110.

As illustrated in FIGS. 3 and 4, a first reacting surface 210 is formed on one surface of the first separator 200 (see FIG. 3), and a first cooling surface 220 is formed on the other surface of the first separator 200 (see FIG. 4). Each of the first reacting surface 210 and the first cooling surface 220 of the first separator 200 includes a reacting region 150 in which an electrochemical reaction takes place and a guide region 140 disposed between the plurality of manifolds 110, 120, and 130 and the reacting region 150. The reacting region 150 may require a predetermined contact pressure to move electricity produced according to the electrochemical reaction, and the guide region 140, in which an electrochemical reaction does not take place, is configured to guide flow of a first reacting gas (fuel or air) and a cooling medium between the manifolds 110, 120, and 130 and the reacting region 150.

FIG. 3 is a view illustrating the first reacting surface 210 of the first separator 200. As illustrated in FIG. 3, a plurality of first reacting gas guide channels 230 are formed in the guide region 140 of the first reacting surface 210, and accordingly, flow of a first reacting gas may be guided between the reacting region 150 and the first reacting gas manifold 110 through the plurality of first reacting gas guide channels 230 (see direction indicated by the arrow "a" of FIG. 3).

As illustrated in FIG. 3, the plurality of first reacting gas channels 230 are formed to continue from the guide region 140 to the reacting region 150. Thus, the first reacting gas may be moved from the first reacting gas manifold 110 to the first reacting gas guide channel 230 of the guide region 140 through the communicating holes 111 as indicated by the arrow "a" of FIG. 3.

FIG. 4 is a view illustrating a first cooling surface 220, opposing the first reacting surface 210 of the first separator 200. As illustrated in FIG. 4, a first cooling medium guide channel 240 is formed in the guide region 140 of the first cooling surface 220, and accordingly, flow of a cooling medium may be guided between the reacting region 150 and the cooling medium manifold 120 through the first cooling medium guide channel 240 (see direction indicated by the arrow "b" of FIG. 4).

As illustrated in FIG. 4, the first cooling medium guide channel 240 has a first edge side guide channel 245 extending along the edge of the guide region 140, a plurality of first continuous channels 241 continued from the first edge side guide channel 245, and a plurality of first discontinuous channels 242 not continued from the first edge side guide channel 245.

The first edge side guide channel 245 extends along the edge of the guide region 140, and one side thereof communicates with the cooling medium manifold 120.

The plurality of first continuous channels 241 are formed to continue from the first edge side guide channel 245, and accordingly, a cooling medium which has passed the first edge side guide channel 245 from the cooling medium manifold 120 may be transferred to the plurality of first continuous channels 241 as indicated by the arrow "b" of FIG. 4.

Some of the plurality of first continuous channels 241 may be connected to communicate with each other through a first communication space 244, and accordingly, the cooling medium transferred from the cooling medium manifold 120 may be uniformly distributed to the plurality of first continuous channels 241 through the first communication space 244.

The plurality of first discontinuous channels 242 are not continued from the first edge side guide channel 245, and thus, the plurality of first discontinuous channels 242 do not communicate with the first edge side guide channel 245.

Figure 5:
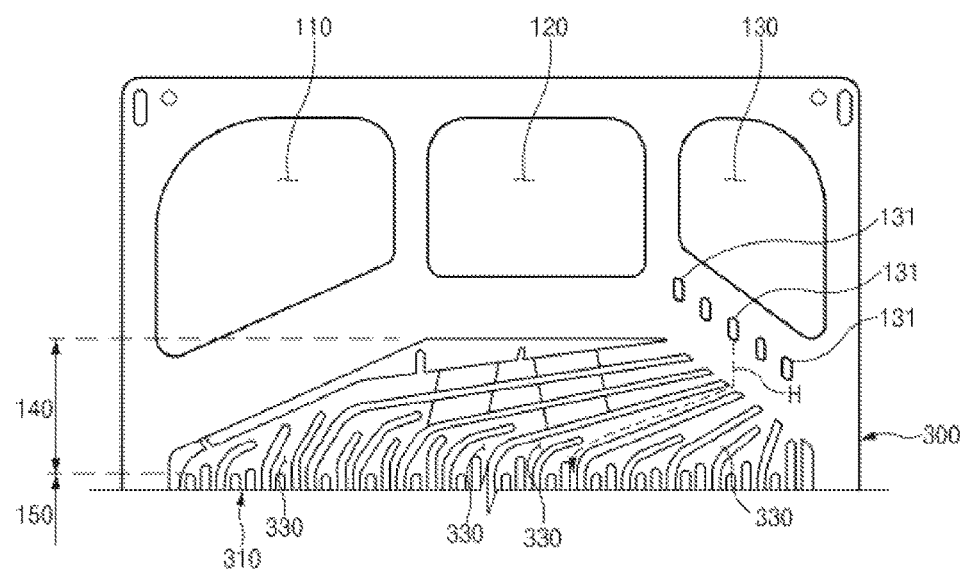
FIG. 5 is a view illustrating a reacting surface of a second separator of a fuel cell stack according to an exemplary embodiment of the present invention.
Figure 6:
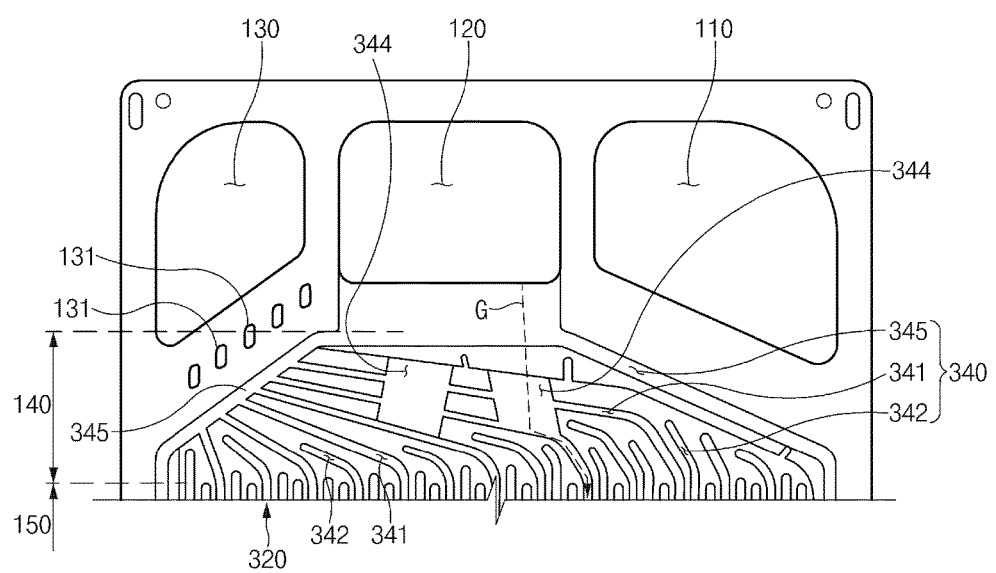
FIG. 6 is a view illustrating a cooling surface of the second separator of a fuel cell stack according to an exemplary embodiment of the present invention.

As illustrated in FIGS. 5 and 6, a plurality of manifolds 110, 120, and 130 respectively corresponding to the manifolds 110, 120, and 130 of the first separator 200 may also be formed in at least one end portion of the second separator 300. A plurality of communicating holes 131 communicating with the second reacting gas manifold 130 are formed to be adjacent to the second reacting gas manifold 130.

As illustrated in FIGS. 5 and 6, the second reacting surface 310 is formed on one surface of the second separator 300 (see FIG. 5), and the second cooling surface 320 is formed on the other surface of the second separator 300 (see FIG. 6). Each of the second reacting surface 310 and the second cooling surface 320 of the second separator 300 includes a reacting region 150 in which an electrochemical reaction takes place and a guide region 140 disposed between the plurality of manifolds 110, 120, and 130 and the reacting region 150. The reacting region 150 may require a predetermined contact pressure to move electricity produced according to the electrochemical reaction, and the guide region 140, in which an electrochemical reaction does not take place, is configured to guide flow of a second reacting gas (fuel or air) and a cooling medium between the manifolds 110, 120, and 130 and the reacting region 150.

FIG. 5 is a view illustrating the second reacting surface 310 of the second separator 300. As illustrated in FIG. 5, a plurality of second reacting gas guide channels 330 are formed in the guide region 140 of the second reacting surface 310, and accordingly, flow of a second reacting gas may be guided between the reacting region 150 and the second reacting gas manifold 130 through the plurality of second reacting gas guide channels 330 (please refer to a direction indicated by the arrow "H" of FIG. 5).

As illustrated in FIG. 5, the plurality of second reacting gas channels 330 are formed to continue from the guide region 140 to the reacting region 150. Thus, the second reacting gas may be moved from the second reacting gas manifold 130 to the second reacting gas guide channel 330 of the guide region 140 through the communicating holes 131 as indicated by the arrow "H" of FIG. 5.

FIG. 6 is a view illustrating a second cooling surface 330, opposing the second reacting surface 310 of the second separator 300. As illustrated in FIG. 6, a second cooling medium guide channel 340 is formed on the second cooling surface 320, and accordingly, flow of a cooling medium may be guided between the reacting region 150 and the cooling medium manifold 120 through the second cooling medium guide channel 340 (please refer to a direction indicated by the arrow G of FIG. 6).

As illustrated in FIG. 6, the second cooling medium guide channel 340 has a second edge side guide channel 345 extending along the edge of the guide region 140, a plurality of second continuous channels 341 continued from the second edge side guide channel 345, and a plurality of second discontinuous channels 342 not continued from the second edge side guide channel 345.

The plurality of second continuous channels 341 are formed to continue from the second edge side guide channel 345, and accordingly, a cooling medium which has passed the second edge side guide channel 345 from the cooling medium manifold 120 may be transferred to the plurality of second continuous channels 341 as indicated by the arrow "G" of FIG. 6.

Some of the plurality of second continuous channels 341 may be connected to communicate with each other through a second communication space 344, and accordingly, the cooling medium transferred from the cooling medium manifold 120 may be uniformly distributed to the plurality of second continuous channels 341 through the second communication space 344.

The plurality of second discontinuous channels 342 are not continued from the second edge side guide channel 345, and thus, the plurality of second discontinuous channels 342 do not communicate with the second edge side guide channel 345.

The first separator 200 may be selectively applied as any one of a cathode side separator and an anode side separator, and thus, the second separator 300 may correspond to the opposite pole of the first separator 200.

For example, when the first separator 200 is a cathode side separator tightly attached to a cathode of the MEA 100 and supplying a gas including oxygen, that is, gas, to the cathode of the MEA 100, the second separator 300 is an anode side separator supplying fuel to an anode of the MEA 100.

Conversely, when the first separator 200 is an anode side separator tightly attached to the anode of the MEA 100 and supplying fuel to the anode of the MEA 100, the second separator 300 is a cathode side separator supplying gas including oxygen, that is, air, to the cathode of the MEA 100.

Figure 7:
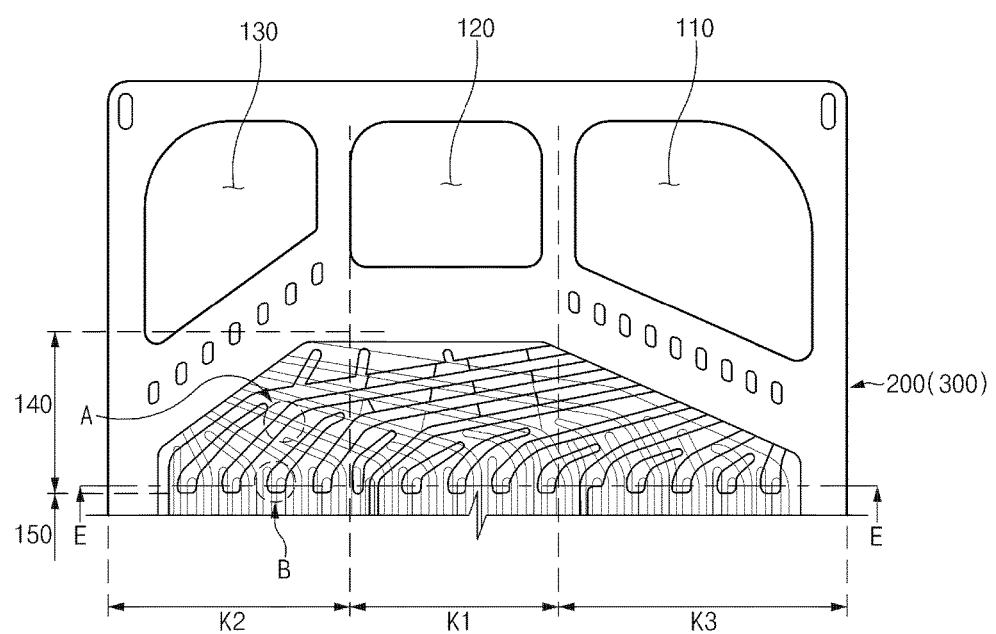
FIG. 7 is a view illustrating a state in which the first separator and the second separator of the fuel cell stack are adhered to face each other according to an exemplary embodiment of the present invention.
Figure 12:
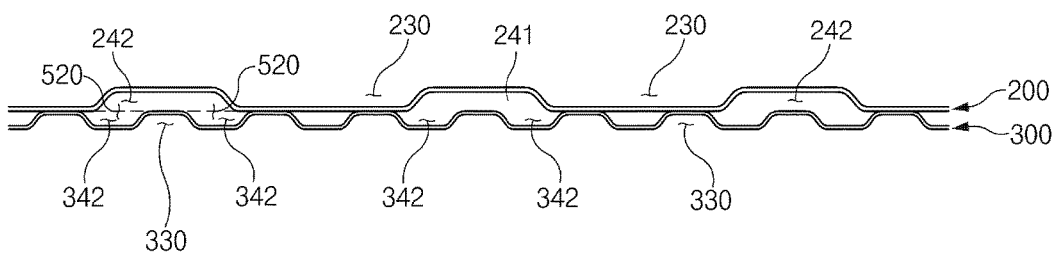
FIG. 12 is a cross-sectional view taken along line E-E of FIG. 7.

Since a plurality of unit fuel cells 400 are stacked, the first cooling surface 220 of the first separator 200 and the second cooling surface 320 of the second separator 300 are adhered to face each other between MEAs adjacent to each other as illustrated in FIGS. 7 and 12.

In particular, at least portions of the first cooling medium guide channel 240 of the first cooling surface 220 and the second cooling medium guide channel 340 of the second cooling surface 320 intersect with each other in an overlapping manner.

The first edge side guide channel 245 of the first cooling medium guide channel 240 and the second edge side guide channel 345 of the second cooling medium guide channel 340 may have the same size and disposition structure, and accordingly, when the first cooling surface 210 of the first separator 200 and the second cooling surface 310 of the second separator 300 are attached to correspond to each other, the first edge side guide channel 245 and the second edge side guide channel 345 may be adhered with the corresponding structure.

As illustrated in FIGS. 7 through 10, the first cooling medium guide channel 240 and the second cooling medium guide channel 340 overlap in at least one section to form overlap portions 510 and 520.

Figure 8:
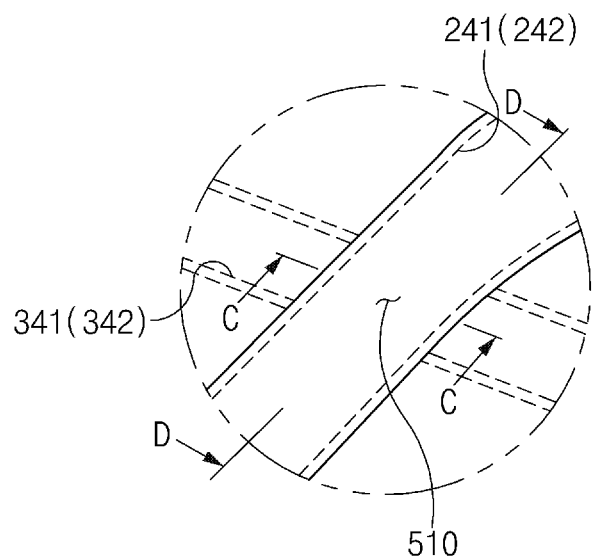
FIG. 8 is an enlarged view of a portion 'A' indicated by the arrow of FIG. 7.
Figure 9:
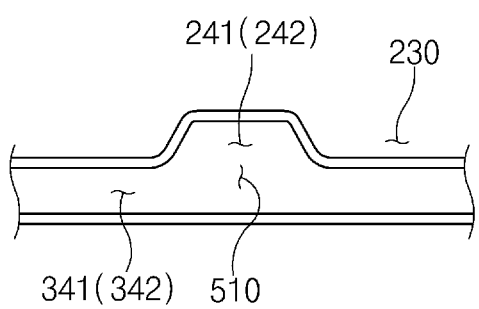
FIG. 9 is a cross-sectional view taken along line C-C of FIG. 8.
Figure 10:
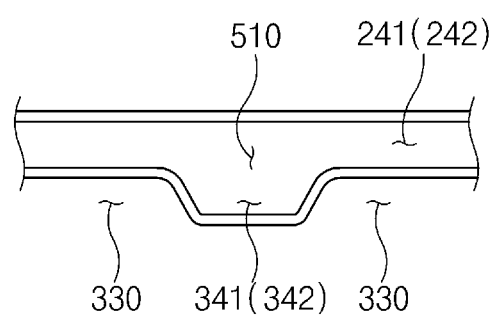
FIG. 10 is a cross-sectional view taken along line D-D of FIG. 8.

As illustrated in FIGS. 8 through 10, the first continuous channel 241 of the first cooling medium guide channel 240 may intersect with the second continuous channel 341 or the second discontinuous channel 342 of the second cooling medium guide channel 340 in a partial section at a predetermined angle in an overlapping manner to form a first overlap portion 510.

According to an alternative exemplary embodiment, the first discontinuous channel 242 of the first cooling medium guide channel 240 may intersect with the second continuous channel 341 or the second discontinuous channel 342 of the second cooling medium guide channel 340 in a partial section at a predetermined angle in an overlapping manner to form a first overlap portion 510.

Since the first cooling medium guide channel 240 and the second cooling medium guide channel 340 may communicate with each other through the first overlap portion 510, a cooling medium may smoothly flow between the first cooling medium guide channel 240 and the second cooling medium guide channel 340.

Figure 11:
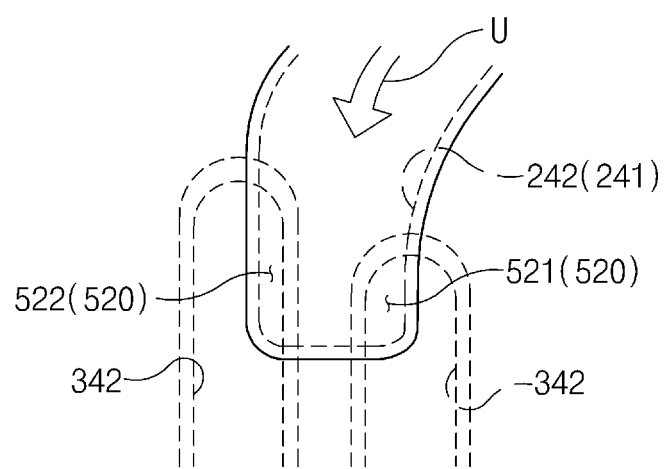
FIG. 11 is an enlarged view of a portion 'B' indicated by the arrow of FIG. 7.
Figure 13:
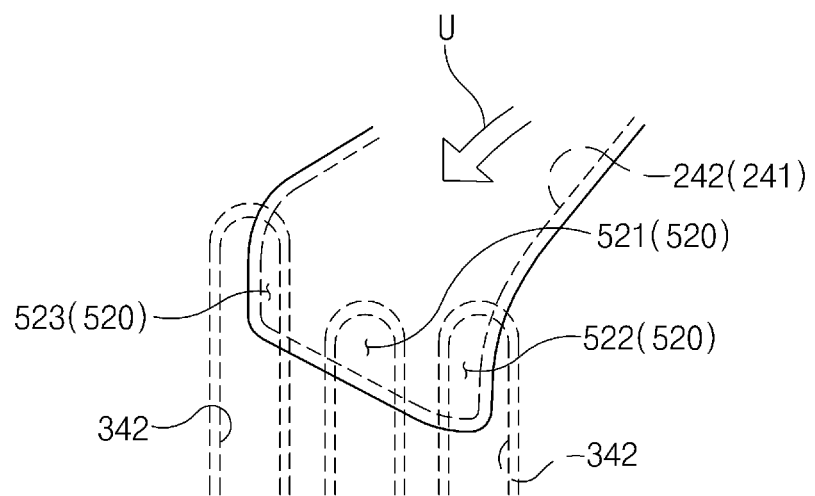
FIG. 13 is a view illustrating an alternative configuration of FIG. 11.

As illustrated in FIGS. 11 through 13, one or more second discontinuous channels 342 may partially overlap one first continuous channel 241 or one first discontinuous channel 242 to form one or more second overlap portions 520.

In a case where two or more second overlap portions 520 are formed, the two or more second overlap portions 520 may be formed such that overlap areas thereof are different to balancedly distribute a cooling medium flow rate.

FIG. 11 illustrates a structure in which two second overlap portions 520 (521 and 522), and here, the two second overlap portions 520 (521 and 522) may be formed to have different overlap areas. Among the two second overlap portions 520 (521 and 522), preferably, the second overlap portion 522 farther from, rather than the second overlap portion 521 close to, a flow direction (see U direction indicated by the arrow of FIG. 11) of the cooling medium may have a smaller overlap area. In particular, since a larger flow rate inclines to the farther side due to a flow inertia of the cooling medium, if the overlap areas of the second overlap portions 520 (521 and 522) are the same, flow rates may be unbalanced. Thus, when the second overlap portion 522 on the farther side has a smaller overlap area than the second overlap portion 521 on the closer side, flow rates of the cooling medium may be balancedly distributed.

FIG. 13 illustrates a structure in which three second overlap portions 520 (521, 522, and 523) are formed. The three second overlap portions 520 (521, 522, and 523) may be formed to have different overlap areas. Among the three second overlap portions 520 (521, 522, and 523), preferably, the middle second overlap portion 521 has the largest overlap area, and among the two overlap portions 522 and 523 disposed on both sides of the middle second overlap portion 521, the second overlap portion 523 farther from, rather than the second overlap portion 522 closer to, the flow direction (please refer to the U direction indicated by the arrow of FIG. 13) of the cooling medium has a smaller overlap area.

In this manner, since one or more second discontinuous channels 342 overlap the first continuous channel 241 or the first discontinuous channel 242 overlap to form one or more second overlap portions 520, the cooling medium may be branched or join between the first discontinuous channel 242 and the second discontinuous channel 342, whereby the cooling medium may smoothly flow between the first cooling medium guide channel 240 of the first separator 200 and the second cooling medium guide channel 340 of the second separator 300, thus ensuring smooth flow of the cooling medium.

According to the alternative exemplary embodiment, since one or more first discontinuous channels 242 partially overlap one second continuous channel 341 or one second discontinuous channel 342, one or more second overlap portions 520 may be formed.

In the present invention described above, since the cooling medium smoothly flows to be appropriately distributed or join between the first cooling medium guide channel 240 and the second cooling medium guide channel 340 by the first overlap portion 510 and the second overlap portion 520, the flow of the cooling medium may be smooth with respect to the reacting surface 210 of the first separator 200 and the reacting surface 310 of the second separator 300. In addition, since the pitches between the cooling medium guide channels 240 and 340 in the guide region are significantly reduced, compared with the related art, even a thin plate with elongation of 60% or less may have considerably enhanced formability.

Meanwhile, as illustrated in FIG. 7, the first and second separators 200 and 300 have a central reaction portion K1 in which the highest temperatures are distributed according to a chemical reaction of the reacting surface and outer reaction portions K2 and K3 disposed on both left and right sides of the central reaction portion K1.

In the central reaction portion K1, one second overlap portion 520 is formed to be more than the two or more second overlap portions 520, and thus, a flow rate of the cooling medium may be increased in the central reaction portion K1.

In the outer reaction portions K2 and K3, two or more second overlap portions 520 are formed to be more than the one second overlap portion 520, and thus, a flow rate of the cooling medium may be decreased in the outer reaction portions K2 and K3.

As a result, a proportion of the two or more second overlap portions 520 is larger in the outer reaction portions K2 and K3 than in the central reaction portion K1, whereby heat transmission efficiency may be maximized by varying a cooling flow rate according to a temperature distribution in the reacting region.

As described above, according to the exemplary embodiments of the present invention, heat transmission efficiency may be significantly enhanced by increasing machining accuracy of the cooling passage in the guide region of each separator and effectively distributing a cooling medium.

In particular, since the pitches of the cooling medium guide channel in the guide region are considerably increased as compared with the related art, even with a material with elongation of 60% or less, formability of a cooling passage in the guide region of the separator may be significantly enhanced.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A fuel cell stack formed by stacking unit fuel cells each having a membrane electrode assembly (MEA) and a pair of separators disposed on opposing sides of the MEA, the fuel cell stack comprising:
a first separator and a second separator adhered to face each other between adjacent MEAs and each have a plurality of manifolds, a reacting region, and a guide region disposed between the plurality of manifolds and the reacting region;
a first cooling medium guide channel guiding flow of a cooling medium between the plurality of manifolds and the first cooling surface, the first cooling medium guide channel being formed in the guide region of the first separator;
a second cooling medium guide channel guiding flow of the cooling medium between the plurality of manifolds and the second cooling surface, the second cooling medium guide channel being formed in the guide region of the second separator; and
at least portions of the first cooling medium guide channel and the second cooling medium guide channel overlapping to communicate with each other,
wherein the first cooling medium guide channel has a first edge side guide channel extending along the edge of the guide region, a plurality of first continuous channels continued from the first edge side guide channel, and a plurality of first discontinuous channels not continued from the first edge side guide channel.

2. The fuel cell stack according to claim 1, wherein some of the plurality of first continuous channels are connected to communicate with each other through a first communication space.

3. The fuel cell stack according to claim 1, wherein the second cooling medium guide channel has a second edge side guide channel extending along the edge of the guide region, a plurality of second continuous channels continued from the second edge side guide channel, and a plurality of second discontinuous channels not continued from the second edge side guide channel.

4. The fuel cell stack according to claim 3, wherein some of the plurality of second continuous channels are connected to communicate with each other through a second communication space.

5. The fuel cell stack according to claim 3, wherein the first cooling medium guide channel and the second cooling medium guide channel intersect with each other in at least one section at a predetermined angle in an overlapping manner to form one or more overlap portions.

6. The fuel cell stack according to claim 5, wherein the plurality of first continuous channels intersect with the plurality of second continuous channels or the plurality of second discontinuous channels in partial sections at a predetermined angle in the overlapping manner to form first overlap portions.

7. The fuel cell stack according to claim 6, wherein the plurality of first discontinuous channels intersect with the plurality of second continuous channels or the plurality of second discontinuous channels in partial sections at a predetermined angle in the overlapping manner to form the first overlap portions.

8. The fuel cell stack according to claim 5, wherein one or more second discontinuous channels partially overlap one first continuous channel to form one or more second overlap portions.

9. The fuel cell stack according to claim 5, wherein one or more second discontinuous channels partially overlap one first discontinuous channel to form one or more second overlap portions.

10. The fuel cell stack according to claim 5, wherein one or more first discontinuous channels partially overlap one second continuous channel to form one or more second overlap portions.

11. The fuel cell stack according to claim 5, wherein one or more first discontinuous channels partially overlap one second discontinuous channel to form one or more second overlap portions.

12. The fuel cell stack according to claim 8, wherein when two or more second overlap portions are formed, the two or more second overlap portions are formed to have different overlap areas.

13. The fuel cell stack according to claim 12, wherein among the two or more second overlap portions, a second overlap portion farther from, than a second overlap portion closer to, a flow direction of the cooling medium has a smaller overlap area.

14. The fuel cell stack according to claim 13, wherein the first and second separators each have a central reaction portion in which the highest temperatures are distributed according to a chemical reaction of a reacting surface and outer reaction portions disposed on both left and right sides of the central reaction portion, and
    a proportion of the two or more second overlap portions is larger in the outer reaction portions than in the central reaction portion.

* * * * *